(12) United States Patent
Oatis

(10) Patent No.: US 9,918,587 B2
(45) Date of Patent: Mar. 20, 2018

(54) ASADOR SPIT

(71) Applicant: William Douglas Oatis, Silver Creek, MS (US)

(72) Inventor: William Douglas Oatis, Silver Creek, MS (US)

( * ) Notice: Subject to any disclaimer, the term of this patent is extended or adjusted under 35 U.S.C. 154(b) by 412 days.

(21) Appl. No.: 14/685,644

(22) Filed: Apr. 14, 2015

(65) Prior Publication Data

US 2016/0302615 A1 Oct. 20, 2016

(51) Int. Cl.
| *A47J 43/18* | (2006.01) |
| *A47J 37/04* | (2006.01) |
| *A01D 9/02* | (2006.01) |
| *A22C 17/00* | (2006.01) |
| *A01D 9/00* | (2006.01) |

(52) U.S. Cl.
CPC ............. *A47J 37/041* (2013.01); *A01D 9/02* (2013.01); *A22C 17/006* (2013.01); *A47J 43/18* (2013.01); *A01D 9/00* (2013.01); *A47J 37/043* (2013.01)

(58) Field of Classification Search
CPC ....... A47J 43/18; A47J 37/041; A22C 17/006; A01B 1/18; A01D 9/00; A01D 9/02
USPC ................... 99/421 A, 421 H, 421 HV, 419; 294/55.5, 49, 50.6; 7/112
See application file for complete search history.

(56) References Cited

U.S. PATENT DOCUMENTS

| 70,984 | A | 11/1867 | Fisher | |
| 311,662 | A | 2/1885 | Knight | |
| 904,382 | A | 11/1908 | Van Patten | |
| 1,063,516 | A | 6/1913 | Guelff | |
| 2,191,226 | A * | 2/1940 | Clem | .................. A47J 37/0694 294/50 |
| 2,815,706 | A | 6/1955 | Weinberger | |
| 2,974,993 | A * | 3/1961 | Duniven | .............. A47G 21/023 294/61 |
| 3,381,606 | A | 5/1968 | Kodey | |
| 3,745,910 | A | 7/1973 | Delamater | |
| 5,918,534 | A | 7/1999 | Medina | |
| 7,069,842 | B1 * | 7/2006 | Liao | ...................... A47J 37/041 99/419 |

(Continued)

OTHER PUBLICATIONS

Wikipedia, "Churrasco", http://en.wikipedia.org/wiki/Churrasco. downloaded Apr. 11, 2015, p. 1 as modified Mar. 17, 2015.

(Continued)

*Primary Examiner* — Reginald L Alexander
(74) *Attorney, Agent, or Firm* — William C. West

(57) ABSTRACT

An improved roasting spit comprising a frame and a handgrip. The frame comprises a frame head portion and a frame handle portion mortised in the handgrip. The head portion comprises a base portion and at least one blade, preferably three blades, extending from the base portion with each blade having a notch for interlocking with a like spit. The frame is resistant to deformation under heavy loads at high temperatures. The spit is employed vertically using a suspension hole in the handgrip or impaled in a ground surface. The spit can also be employed horizontally by interlocking the notches with a like spit, inserting the spit in a stand, or propping the spit on rocks. A tip portion of each blade tapers to a tip point along a plurality of triangular faces forming a plurality of cutting edges that allow the spit to easily impale a large mass of meat.

15 Claims, 15 Drawing Sheets

(56) References Cited

U.S. PATENT DOCUMENTS 8,960,083 B2 * 2/2015 Wong .................... A47J 37/049
126/25 A

OTHER PUBLICATIONS

Hickory Industries Inc , "Churrasco Accessories" downloaded Apr. 14, 2015 from http.//www.hickorybbq.com/chur4.htm, Hickory Industrusies Inc., North Bergen, NJ.

* cited by examiner

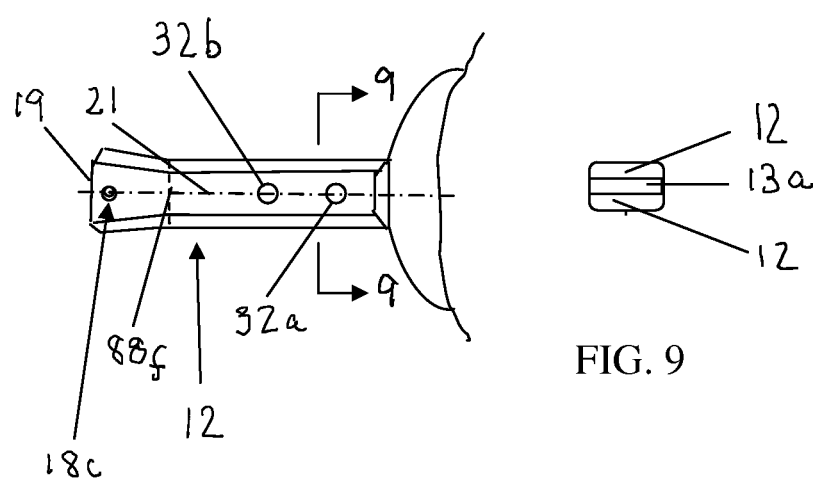
FIG. 7
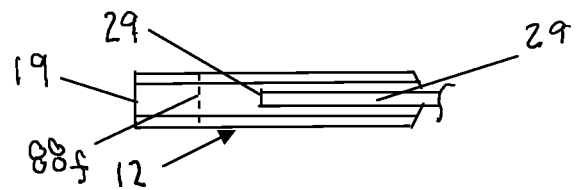
FIG. 8
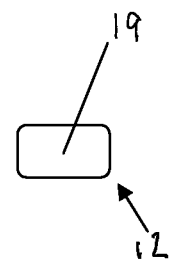
FIG. 9
FIG. 10

ASADOR SPIT

TECHNICAL FIELD AND INDUSTRIAL APPLICABILITY OF THE INVENTION

This device relates to a device for roasting. More particularly, the invention relates to an asador spit with one or more blades of a type which may impale and hold an article of food, and may hold the article of food when each blade is oriented vertically or horizontally allowing the article of food to be roasted over a heat source, such as a bed of hot coals.

BACKGROUND OF THE INVENTION

Prior Art: An Asador is a professional who cooks with wood and fire. Cooking with a ground fire is a method common in the southern regions of South America where natural wood is burned down into coals and harvested to support the cooking process. Spits have been around of centuries. Examples of two spits mounted to a separate spit frame are found in the 1885 U.S. Pat. No. 311,662 to Knight. The patent shows two cooperating spits, one with three prongs and another with two prongs. One fork is inserted in one end of a piece of meat and the other fork is inserted in the opposite end of the meat and the handle on each fork is inserted in the separate spit frame in an operative state. There are no tie-down holes to hold large cuts of meat if the spits are used in stand along vertical position suspended from the spit handle or impaled in a dirt surface. Another example of a spit is found in the 1968 U.S. Pat. No. 3,381,606 to Kodey. Kodey teaches a device with a pointed business end and no tie-down holes. The device is configured to be used with a separate frame for roasting in a horizontal position. U.S. Pat. No. 3,745,910 to Delamater teaches a spit with a plurality of tines in a circular configuration. The tines have no tie-down holes and the tines are designed for roasting small cuts of meat such as wieners and the spit of Delamater is not designed to be impaled in a ground surface. Referring "Wikipedia" and looking under the word "Churrasco", several spits are pictured with a variety of tips. However, these tips are either cone shaped, limited to four triangular faces with less than sharp cutting edges, or structurally not designed for large cuts of meat. The one or more blades of the present invention each have a novel tip portion having a plurality of faces that form a plurality of sharp cutting edges, allowing the spit to easily impale large cuts of meat such as steaks and roasts. The present invention may be employed horizontally or vertically over a bed of hot coals. The present invention, the blade corner portion asador spit, is distinguished from prior art by its sheer versatility. It is designed to vertically slow roast large cuts of meat while suspended from a line or impaled into the ground over an extremely high heat source, such a bed of hot coals. Additionally, the present invention is designed for horizontal applications, for example, it may be impaled in a stand, interlocked with a like asador spit, or propped on rocks over the bed of hot coals. Also, cooking devices such as a cast iron kettle or a wire grate may be suspended from the present invention when it is employed horizontally over the heat source. The capability of single or multi-prong culinary tools to penetrate heavy cuts of meat and maintain their structure, and to resist warping during high heat applications, the most prevalent method of employment envisioned for this invention, is critical for understanding why the present invention is superior to other prior art spit designs. Temperature, size, tip, tie-downs, and handgrip are all considerations that must be addressed when designing the asador spit.

Temperature: When working with single or multi-prong implements over high heat (in excess of 750 degrees Fahrenheit); the metals of many implements may break down and eventually rust making the implements unsanitary for culinary usage. Moreover, extremely high heat levels—the type of heat required to properly sear a steak—cause non-tempered metals to warp, thus dealigning a pointed end of a spit's prong making the process of impaling tough fibered and fat marbled meat (e.g. a Ribeye steak) not only dangerous, but virtually impossible. It has been determined that there are two optimum steels from a region of the world that addresses all of the requirements for effective spit design. Northern Europe is a region of the world that still blends high quality metals with Old World hand-forging craftsmanship. Tempered Swedish Boron steel is the preferred raw material because of its inherent hardness and ability to perform consistently with high heat. Specially formulated stainless steel that has been hand annealed in a coal fire is the second metal that we've found suitable. Although many believe that stainless steel can not be tempered to a point where it meets minimum hardness levels for tooling, a condition largely due to chromium being added to the metallurgy to gives the metal its shine, a highly skilled blacksmith can temper stainless steel by hand if he uses a coal fire and he can bond the carbon molecules with the steel at the right temperature. What's unique to both of these metals is the fact that both metals have to be handled by skilled blacksmiths using proprietary recipes that have literally been handed down for hundreds of years. In most cases, manufacturers of many prior art designs order steel from a catalog and build their tools in an automated fashion based on the cheapest materials available. Because many applications are single purpose designs, this process is sufficient. However, many of the tools based on single purpose designs have narrow load and temperatures ranges and usually fail in scenarios that involve the roasting of a large mass of meat under high temperatures.

Size: A spit blade that is too thick and too wide increases the frictional force when impaling tough cuts of meat and makes the impaling more difficult and less safe. Moreover, when inserting the spit blade 2 inches into the ground for roasting vertically, a blade that is too wide has a tendency to break apart and displace more of the hard packed soil than is necessary, causing the spit to lose support of the surrounding soil resulting in the spit tipping over and falling into the dirt. Additionally, physically inserting the blade into fibrous meat safely on an intended path is very difficult and the frictional force to be overcome increases with each additional blade. When designing spits with an odd number of blades, for example a spit having three blades, making the center blade slightly longer than the two side blades allows the maximum force to be applied to a single point during an initial puncture quickly followed by additional punctures by the two sides blades safely penetrating the fibrous meat on the intended path. When designing a spit with an even number of blades, for example a spit with two blades, the two blades should be of the some length, and for a spit with an even number of blades greater than two, the two central blades should be of the same length and slightly longer that the other blades.

The Tip: One of the biggest engineering challenges of the present invention is designing the tip portion that can safely impale meat and be physically driven into the ground during vertical slow roasting applications. Preferably, a hardened spit has the tip portion heat treated for additional strength. Another important consideration is a dealignment of a spit's tip point. A dealignment occurs when the tip point warps while the tip point is employed at different angles. The dealignment may make the process of impaling a meat impossible and dangerous. Any metal, regardless of how it is formulated or crafted, may warp when employed under heavy loads at high temperatures. For the present invention, several prototypes tested to failure under high temperatures and heavy loads established baseline configurations and physical specifications. The preferred tip point has preferably 8 triangular flat faces forming 10 cutting edges, allowing each of the blades to expand the blade's initial puncture hole into the meat.

Tie-Down Holes: When a heavy cut of meat is roasted vertically over a fire, some form of "tie" (kitchen twine is the most practical) must be used to keep the meat from physically sliding off the spit and falling to the ground or into the fire. The plurality of tie-down holes of the present invention is configured so that at least one "tie" may be placed across or through the heavy cut of meat and used to secure the meat to the spit of the present invention. For example, for a spit with a rear tie-down hole and a forward tie-down hole, once the "tie" is placed across the heavy cut of meat, one end of the "tie" may be inserted through the rear tie-down hole, and another end of the tie may be placed through the forward tie-down hole, and the ends of the "tie" pulled tight to take any slack out the "tie" and the ends of the "tie" secured to each other holding the heavy cut of meat in its preferred roasting position.

Handgrip: The handgrip of the present invention is designed to have a slight "flare" on a handgrip distal end. This "flare" aids the user in holding the present invention vertically. For example, when transferring the spit from a kitchen to a fire area while the spit is laden with a heavy cut of meat, the "flare" allows the spit to be comfortably held vertically with the pointed end composed of one or more tip points being closest to the ground. Although it is recommended that the user have clean and dry hands, it is expected that some users will have slippery palms due to residues from coatings, such as a seasoning and an olive oil, applied to the meat. The "flare" will make the spit less likely to slip out of the user's hand. Moreover, the flared handgrip makes the spit easier to hold at chest level while preparing to suspend the spit from a hold point located above a fire. For example, one end of a wire can be attached to a suspension hold in the handgrip and the other end of the wire can be attached to the hold point, allowing the spit to be suspended over the fire. A brisket can weight 15 pounds and the spit may take 30-45 seconds to attach to a hold point using the suspension means, making the flared handgrip instrumental in the user maintaining positive control of the spit.

SUMMARY OF THE INVENTION

The present invention provides an easy method of roasting one or more food articles over a coal fire and more particularly barbeques. An object of the present invention is to provide a roasting spit, an asador spit, which may easily be manipulated so as to readily engage or receive various articles, such as a large cut of meat. The asador spit comprises a handgrip and a frame. The frame comprises a frame handle portion and a head portion with the head portion further comprising a base portion, at least one blade, and a plurality of tie-down holes. The preferred embodiment of the present invention will have 3 blades, such as a first outer blade, a second outer blade, and a center blade, with the blades extending from the base portion and with each blade having a notch to interlock with a like spit allowing the like spit to hold the preferred embodiment horizontal. Additionally, the preferred embodiment will have at least a rear tie hole and a forward tie hole. The rear and forward tie-downs holes allow a user to secure the food article to be roasted, such as the large cut of meat, with a tie. For example, a first end of the tie may be placed across or through the large cut of meat and then a first end of the tie put through the rear tie-down hole and a second end of the tie put though the forward tie-down hole and the first end of the tie secured to the second end of the tie. Each blade has an identical tip portion. The tip portion has a plurality of triangular faces that form a plurality of sharp cutting edges with the tip portion narrowing to a tip point. The frame handle portion is mortised in the handgrip, and the handgrip is made of low-heat conducting material allowing the spit to be comfortably held. Optionally, the handgrip may also be wrapped with a low heat conducting material, such as leather covering any exposed metal on the frame handle portion. The food article, such as the large cut of meat, may be roasted generally horizontally by impaling the blade of a single blade spit and the blades of the multi-blade spit into a penetrable stand, by resting the handgrip and the tip portion of each blade on rocks, or by interlocking the spit with the like spit using the notch in each blade with the bed of hot coals beneath. Alternatively, the blade of a single blade spit and the blades of the multi-blade spit of the present invention may be impaled vertically into a ground surface, or hung vertically using a suspension hole in the handgrip to hold the spit with the food article over the hot coals.

BRIEF DESCRIPTION OF THE DRAWINGS

FIG. 7 shows a handgrip of the present invention FIG. 8 shows a frame handle portion mortised in the handgrip FIG. 9 shows a cross sectional view of the handgrip in FIG. 8

FIG. 10 shows a handgrip distal end view of the present invention

DESCRIPTION OF THE PREFERRED EMBODIMENT

Figure 1:
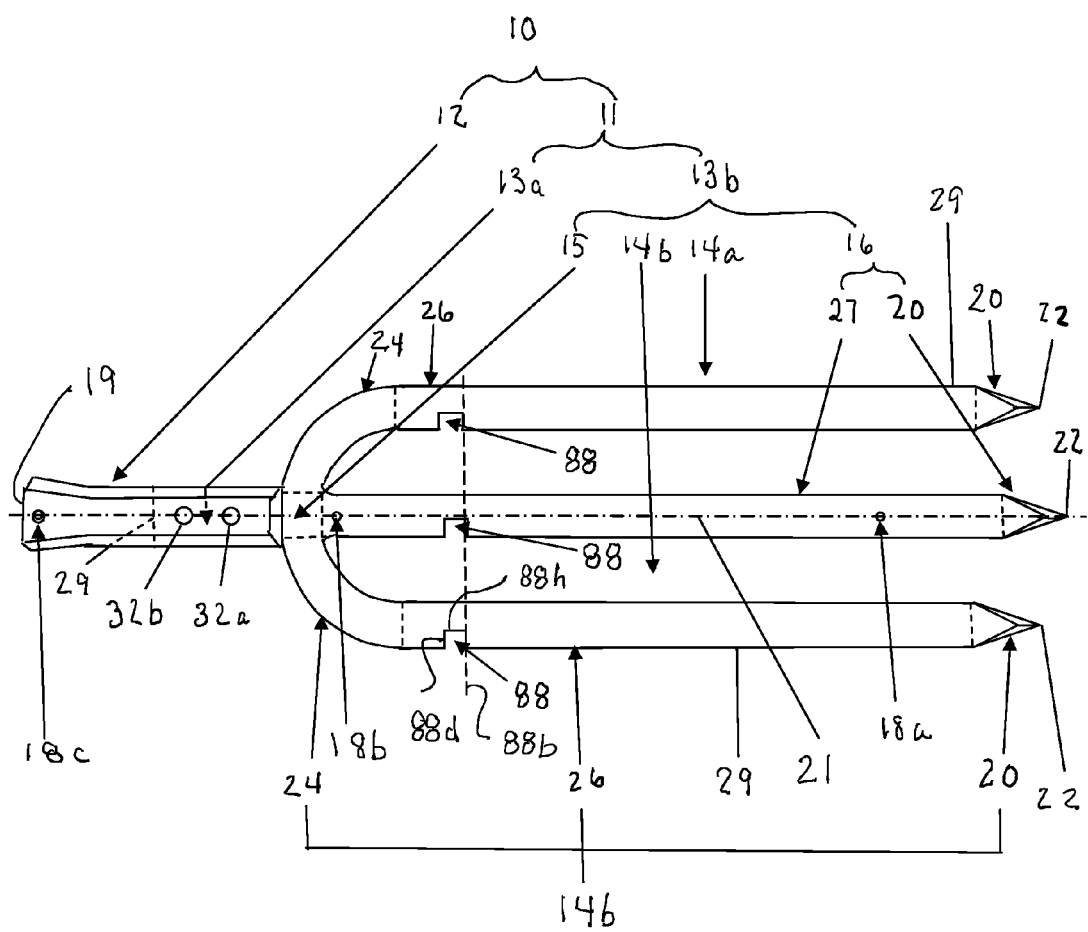
FIG. 1 shows is a frame first face view of the present invention
Figure 2A:
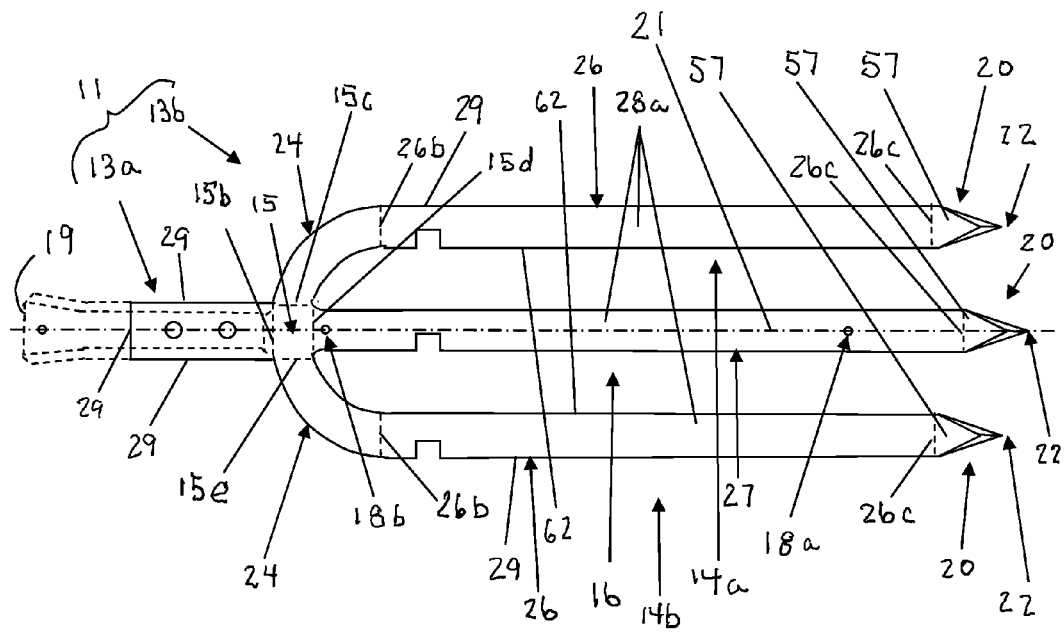
FIG. 2a shows is another frame first face view of the present invention

When referring to the drawings, like numbers represent like parts and portions. Referring first to FIG. 1 of the drawings, a plan view of one embodiment of the present invention, an asador spit 10 with three blades is presented. The asador spit 10 comprises a frame 11 and a handgrip 12. Looking at FIGS. 1, 2a and 2b, the frame 11 of the asador spit 10 has the overall shape of a flat fork and may be cut from a plate. FIGS. 2c and 2d are views of the frame 11 rotated 180 degrees from the views in FIGS. 2a and 2b, respectively. Looking at FIGS. 2a, 2b, 2c and 2d, views of the frame 11 with the handgrip 12 removed, the assembled location of the handgrip 12 is represented by dashed lines. Looking again at FIGS. 1 and 2b, the frame 11 comprises an elongated frame handle portion 13a and a head portion 13b. The head portion 13b may comprise one or more blades, but preferably three blades as shown in FIG. 1. Looking again to FIG. 1, the head portion 13b comprises a first outer blade 14a, a second outer blade 14b, a base portion 15, and a center blade 16. The head portion 13b further comprises a plurality of tie-down holes, such as a forward tie-down hole 18a and a rear tie-down hole 18b. The handgrip 12 has a handgrip distal end 19 with a suspension hole 18c located generally 1-2 cm, preferably 1.5 cm, from the handgrip distal end 19. The first outer blade 14a, the second outer blade 14b and the center blade 16 each have an identical tip portion 20 with a tip point 22. When a term "rear" is used to modify an element, the element is closer to the handgrip distal end 19 than a like element with a term "forward" as a modifier. The word "forward" when used by itself means toward the tip point 22. Looking at FIGS. 2a and 2c, the base portion 15 is bounded by a base rear plane 15b, a base first outer plane 15c, a base forward plane 15d, and a base second outer plane 15e, are shown as dashed lines. Looking again at FIGS. 1, 3a, and 3b, the tip portion 20 of the first outer blade 14a, the tip portion 20 of the second outer blade 14b, and the tip portion 20 of center blade 16 each taper to a point, such as the tip point 22 of the first outer blade 14a. Referring to FIG. 3c, the tip portion 20 of each blade, such as the tip portion 20 of the center blade 16, is used to impale a food article, such as a roast 23. Looking again at FIGS. 1, 2a and 2c, the first outer blade 14a and the second outer blade 14b each comprise a blade corner portion 24, an elongated mid portion, such as an outer-mid portion 26, and the tip portion 20 that narrows to the tip point 22, with the outer-mid portion 26 located between the blade corner portion 24 and the tip portion 20. Looking at FIG. 2a, the outer-mid portion 26 of the outer blades, such as first outer blade 14a, is located between a rear divide plane 26b and a tip portion base plane 26c. The rear divide plane 26b and the tip portion base plane 26c are the opposite ends of the outer-mid portion 26 of each outer blade, such as the first outer blade 14a. Looking at the center blade 16, the center blade 16 has a mid portion that is elongated, such as a center-mid portion 27, and the center-mid portion 27 is located between the base forward plane 15d and the tip portion base plane 26c. The tip portion base plane 26c is the base of the tip portion 20. The blade corner portion of each outer blade, such as the blade corner portion 24 of the first outer blade 14a, is generally shaped like a quarter of a flat donut and the blade corner portion 24 is located between the base portion 15 of the frame 11 and the outer-mid portion of the first each outer blade, such as the outer-mid portion 26 of the first outer blade 14a. The center blade 16 comprises the elongated center-mid portion 27 and the tip portion 20 with the center-mid portion 27 located between the base portion 15 and the tip portion 20. The outer-mid portions of the outer blades, such as the outer mid portion 26 of first outer blade 14a, and the center-mid portion 27 of center blade 16 are rectangular cuboids with the outer-mid portion 26 of the first outer blade 14a, the outer-mid portion 26 of the second outer blade 14b, and the center-mid portion 27 of center blade 16 each have an identical rectangular cross section, and the tip point 22 of the center blade 16 is forward of the tip point 22 of first outer blade 14a and the tip point 22 of the second outer blade 14b.

Preferably, when there are an odd number of blades, the tip point 22 of the center blade 16 is 25 mm forward of the tip point 22 of the outer blades, such as first outer blade 14a and the second outer blade 14b. The outer-mid portion of each outer blade, such as the outer-mid portion 26 of the first outer blade 14a, and the center-mid portion 27 of the center blade 16 are parallel to each other. The outer-mid portion 26 of the first outer blade 14a and the second outer blade 14b are evenly spaced from the center-mid portion 27 of the center blade 16.

The frame 11 is made of a high strength material that can withstand high temperatures. For example, the frame 11 may be made of stainless steel or boron steel, preferably boron steel. The center blade 16 is somewhat longer the first 14a and second 14b outer blades, and the center blade 16 has the forward tie-down hole 18a and the rear tie-down hole 18b. The rear tie-down hole 18b and the forward tie-down hole 18a may be centered on the longitudinal axis 21. For example, the forward tie-down hole 18a may be 1 cm from the tip portion 20 and the rear tie-down hole 18b may be 1 cm forward of the base portion 15. Looking at FIG. 3d, a view of the asador spit 10 vertically suspended from a hold 18d using a line 18e through the suspension hole 18c, the forward tie-down hole 18a and the rear tie-down hole 18b are sized to accommodate a tie 46 running through the rear tie-down hole 18b and through the forward tie-down hole 18a. The tie 46 may secure a food article, such as the roast 23, preventing the roast 23 from sliding off of the first outer blade 14a, the second outer blade 14b, and the center blade 16, and falling to the bed of hot coals 42. The rear tie-down hole 18b and the forward tie-down hole 18a are circular, and each has a diameter of 3-6 mm, preferably 5 mm. The suspension hole 18c is circular and may have a diameter of 3-15 mm, preferably 8 mm. Looking again to FIG. 2a, the first outer blade 14a, the second outer blade 14b, and center blade 16 each have a preferable blade width, as measured perpendicular to a longitudinal axis 21 from the outer edge 29 of the outer-mid portion 26 of the second outer blade 14b to the inner edge 62, of 1 to 3 cm, preferably 2.2 cm, and looking to FIG. 2b, a preferable blade thickness as measured from a frame first face 28a to a second face 28b of 5.0 mm Looking at FIG. 1 the asador spit 10 the longitudinal axis 21 runs from the handgrip distal end 19 to the tip point 22 of the center blade 16. The longitudinal axis 21 is centered in the frame handle portion 13a and the center-mid portion 27 of the center blade 16. Looking to FIG. 2a, the frame 11 is shown by solid lines and the handgrip 12 is shown by dashed lines, and the frame handle portion 13a extends from the base rear plane 15b.

Looking again to FIGS. 2b and 2c, the frame 11 has a frame first face 28a, a frame second face 28b and an outer edge 29. Looking at FIGS. 2a and 2c, the base rear plane 15b, the base first outer plane 15c, the base forward plane 15d, and the base second outer plane 15e are generally perpendicular to the frame first face 28a and the frame second face 28b. Looking again to FIG. 1, the outer edge 29 runs from the tip portion 20 of the first outer blade 14a around the frame handle portion 13a to the tip portion 20 of the second outer blade 14b. Referring to FIGS. 1, 2a and 2c, the frame handle portion 13a is mortised in the handgrip 12 and secured to the handgrip 12 by a first fastener 32a and a second fastener 32b. The first fastener 32a and the second fastener 32b may be a screw, a rivet, or a bolt fastened to a nut, but preferably a rivet.

Referring to FIG. 1, the base portion 15 is located between the frame handle portion 13a and the center-mid portion 27 of the center blade 16, and the base portion 15 is also located between the blade corner portion 24 of the first outer blade 14a and the blade corner portion 24 of the second outer blade 14b. The frame handle portion 13a and the center blade 16 are each centered on the longitudinal axis 21 and each extends from the base portion 15 in opposite directions. The blade corner portion 24 of the first outer blade 14a extends from the base portion 15 in a direction opposite the blade corner portion 24 of the second outer blade 14b, and the corner portion of each outer blade, such as the blade corner portion 24 of the first outer blade 14a, initially extends from the base portion 15 in a direction perpendicular to the longitudinal axis 21, and then the corner portion of each outer blade, such as the blade corner portion 24 of the first outer blade 14a, curves around and joins the outer-mid portion of each outer blade, such as outer-mid portion 26 of first outer blade 14a. The outer-mid portion of each outer blade, such as outer-mid portion 26 of the first outer blade 14a, is generally parallel to the center-mid portion 27 of the center blade 16.

Figure 3A:
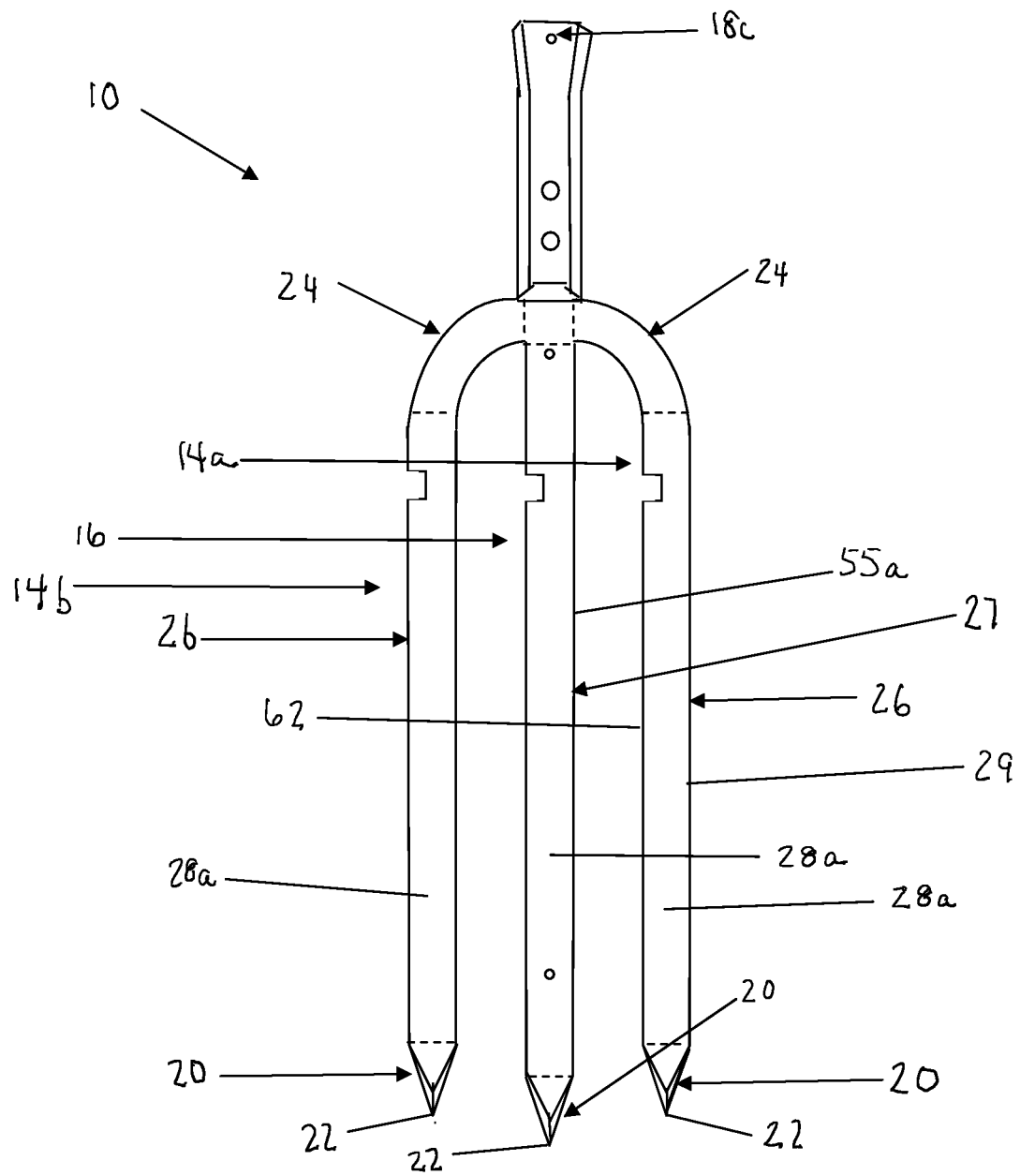
FIG. 3a shows a first face view of the present invention in a vertical position
Figure 3B:
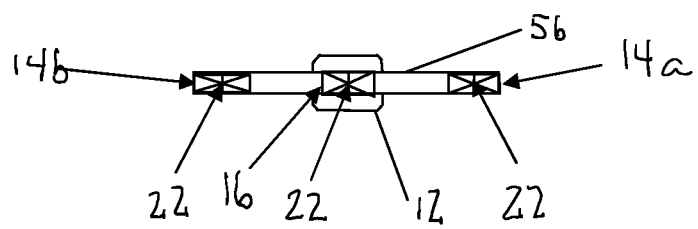
FIG. 3b shows a tip point frontal view of the present invention
Figure 3C:
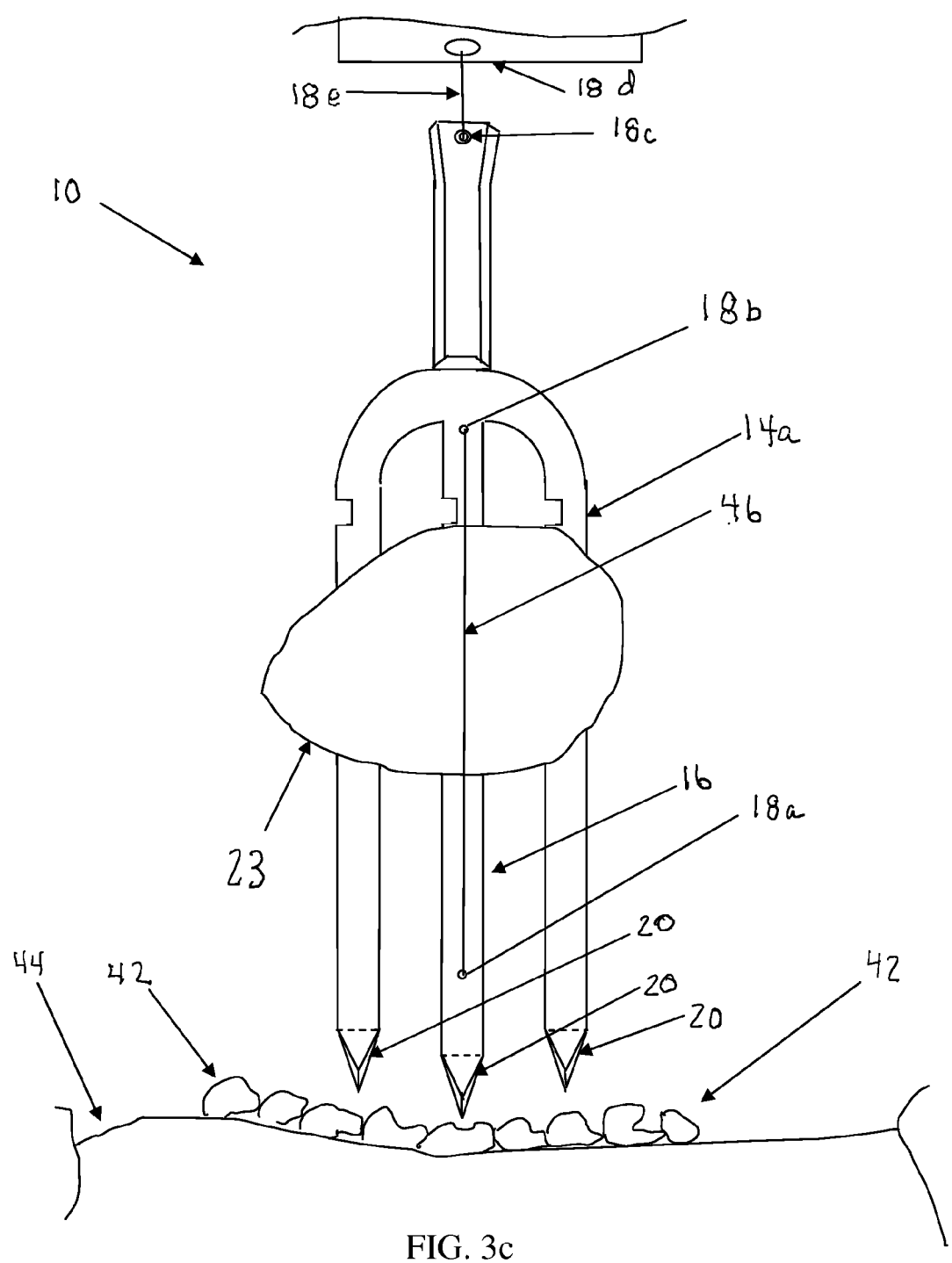
FIG. 3c shows the present invention suspended vertically with a roast attached
Figure 3D:
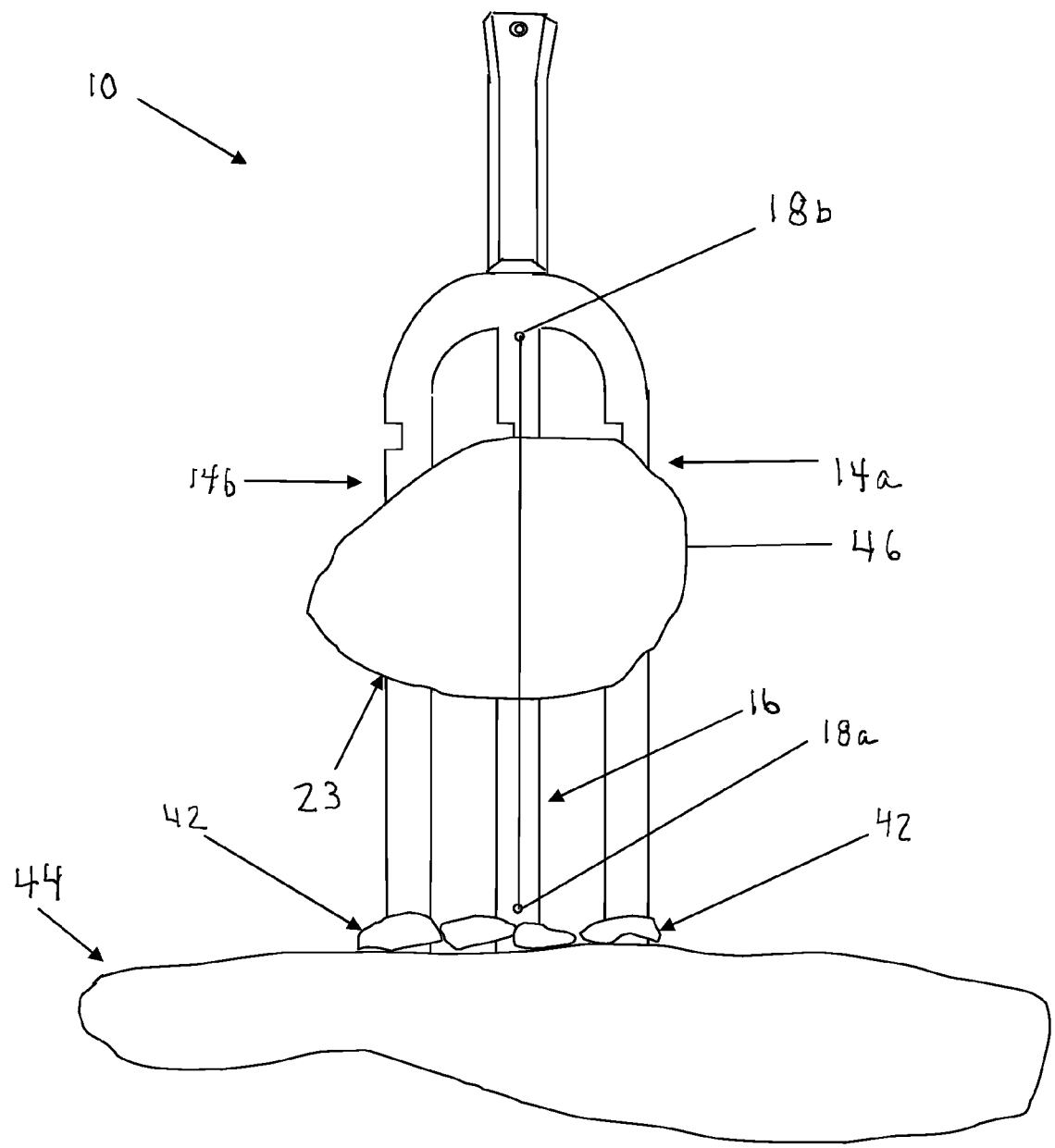
FIG. 3d shows is a view of the present invention impaled in a ground surface
Figure 3E:
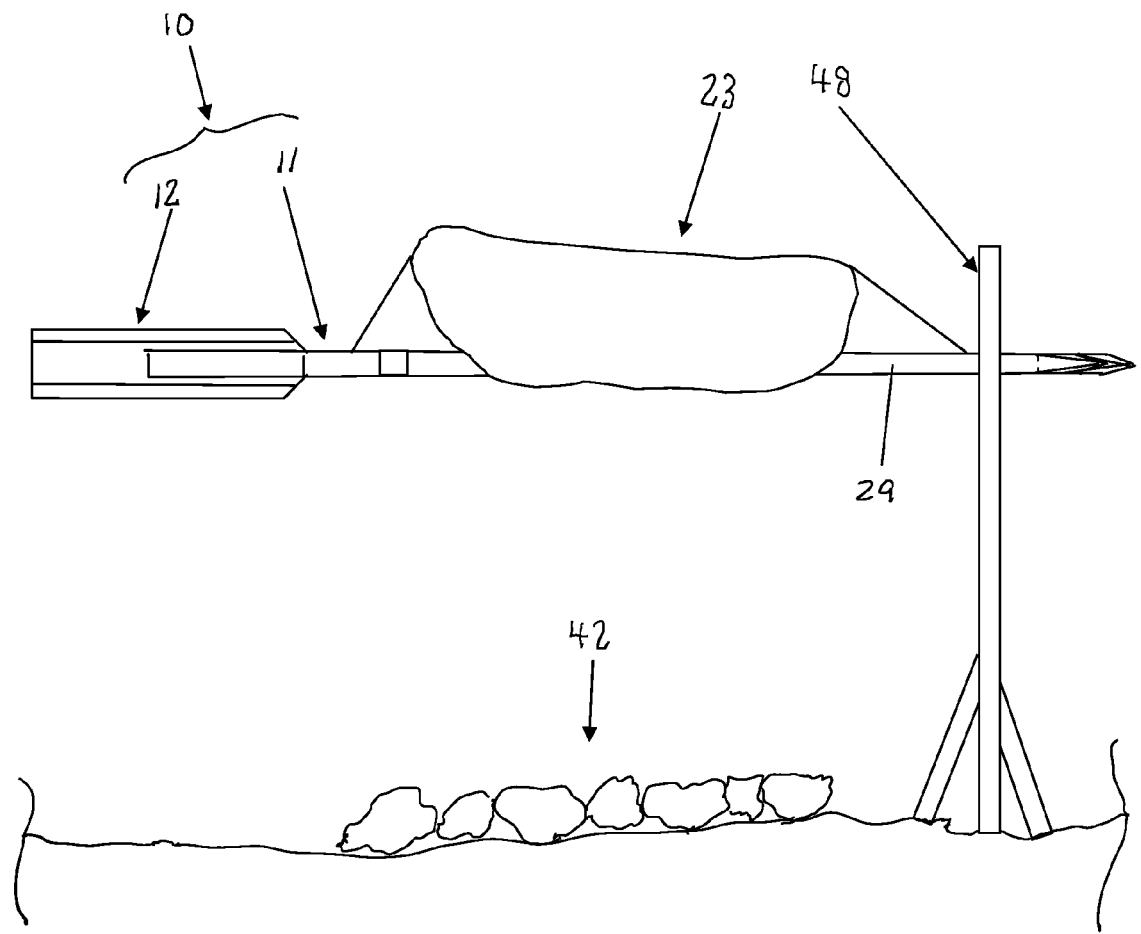
FIG. 3e shows the present invention employed horizontally impaled in a stand
Figure 3F:
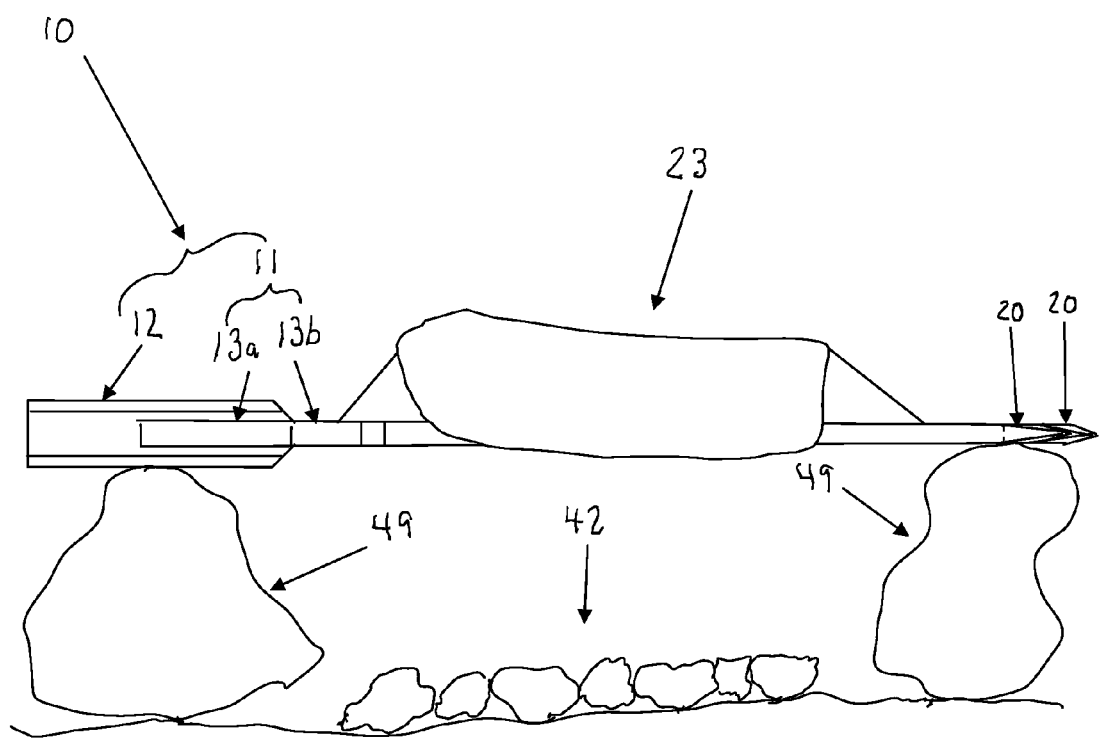
FIG. 3f shows the present invention employed horizontally supported by rocks

The asador spit 10 may be employed vertically as shown in FIG. 3a or horizontally as shown in FIG. 3b. Looking at FIG. 3c, the asador spit 10 may be hung vertically using the suspension hole 18c in the handgrip 12 so that a food article, such as the roast 23, is over a heat source, such as the bed of hot coals 42. Looking at FIG. 3d, the first outer blade 14a, the second outer blade 14b, and the center blade 16 of the asador spit 10 may be impaled vertically into a ground surface 44 to roast large cuts of meat, such the roast 23, along the periphery of the bed of hot coals 42. Looking at FIG. 3e, the asador spit 10 may be inserted in a stand 48, or looking at FIG. 3f, the asador spit 10 may be employed horizontally to roast the food article, such as the roast 23, by resting the handgrip 12 and the tip portions of the blades, such as tip portion 20 of the second outer blade 14b, and the tip portion 20 of the center blade 16 on some rocks 49 above the bed of hot coals 42.

Figure 4A:
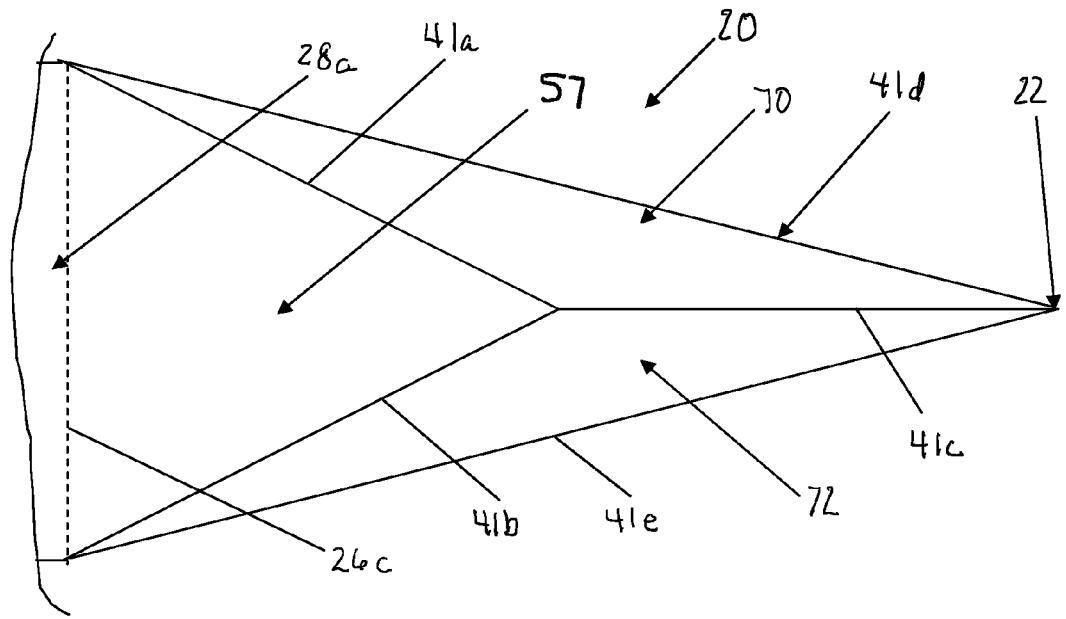
FIG. 4a shows a first face extension view of a tip portion of present invention
Figure 4B:
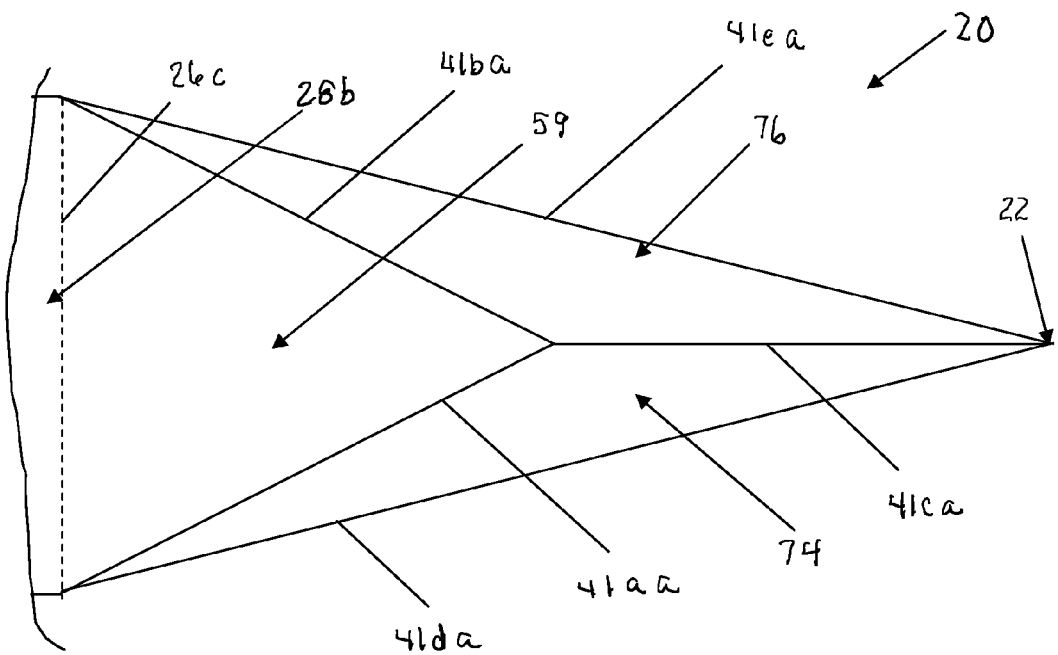
FIG. 4b shows a second face extension view of the tip portion of present invention
Figure 5A:
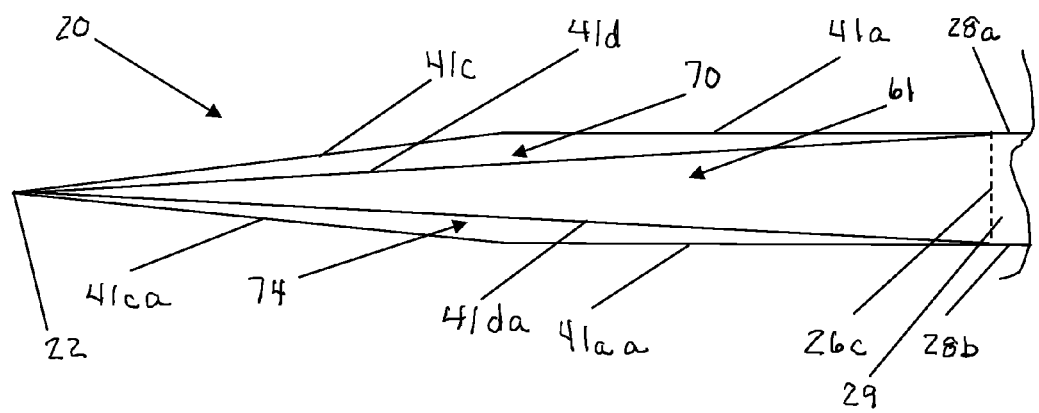
FIG. 5a shows a first edge extension view of the tip portion
Figure 5B:
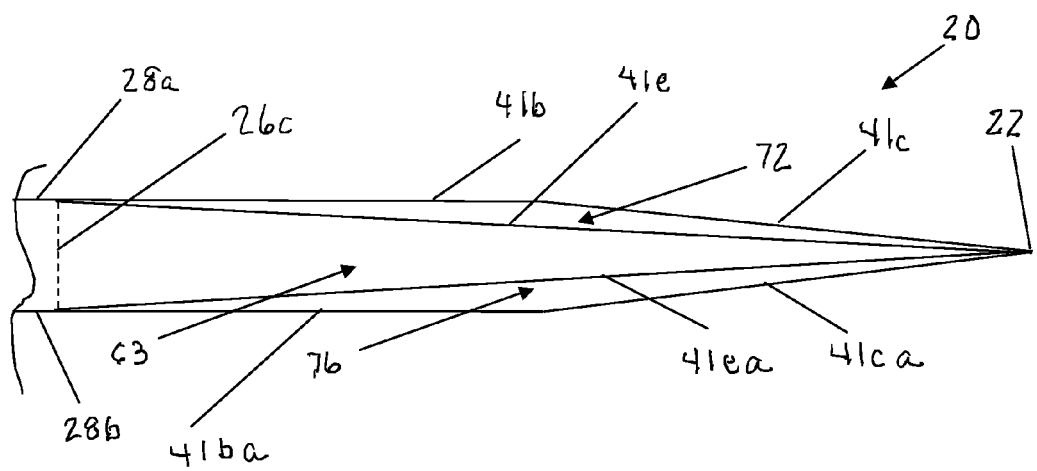
FIG. 5b shows a second edge extension view of the tip portion
Figure 6:
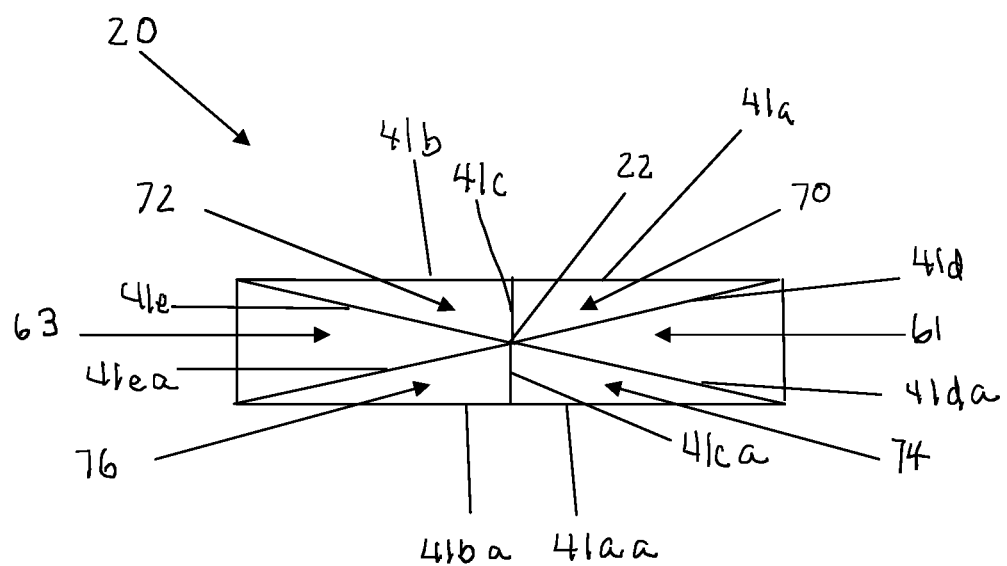
FIG. 6 shows a frontal view of a tip point of the blade of the present invention

Looking at FIGS. 4a, 4b, 5a, and 5b, and more particularly FIG. 6, the preferred tip portion 20 comprises a plurality of triangular faces such as: a first face extension 57 and a second face extension 59 shown in FIGS. 4a and 4b, respectively, and looking at FIG. 6, a first edge extension 61, a second edge extension 63, a first face first tip triangle 70, a first face second tip triangle 72, a second face first tip triangle 74, and a second face second tip triangle 76 forming a plurality of cutting edges such as a first 41a, a second 41b, a third 41c, a fourth 41d, a fifth 41e, a sixth 41aa, a seventh 41ba, an eight 41ca, a ninth 41da, and a tenth 41ea cutting edge as the tip portion 20 tapers to the tip point 22 making the tip portions of each blade, such as the tip portion 20 of the first outer blade 14a, capable of safely cutting through a mass of meat, such as the roast 23 in FIG. 3c, with minimal effort. Each of the cutting edges, such the first cutting edge 41a, is a sharp edge. Where a phase "in common with" is used in the claims or specification the phase means a sharing or forming of a particular element. For example, the first face first tip triangle 70 has the first cutting edge 41a in common with the first face extension 57. This means the first face first tip triangle 70 and the first face extension 57 share the first cutting edge 41a.

Looking again to FIG. 6, a view of the tip portion 20, the first edge extension 61 and the second edge extension 63 are each triangular faces having the tip point 22 as a vertex. The first edge extension 61 has the fourth cutting edge 41d in common with the first face first tip triangle 70, and the first edge extension 61 the ninth cutting edge 41da in common with the second face first tip triangle 74.

The second edge extension 63 has the fifth cutting edge 41e in common with the first face second tip triangle 72, and second edge extension 63 also has the tenth cutting edge 41ea in common with the second face second tip triangle 76.

The first face first tip triangle 70 has the first cutting edge 41a in common with the first face extension 57 as shown in FIG. 4a, and the first face first tip triangle 70 has the third cutting edge 41c in common with the first face second tip triangle 72.

The second face first tip triangle 74 has the sixth cutting edge 41aa in common with the second face extension 59 as shown in FIG. 4b, and the second face first tip triangle 74 has the eight cutting edge 41ca in common with the second face second tip triangle 76.

The first face second tip triangle 72 has the second cutting edge 41b in common with first face extension 57 shown in FIG. 4a.

The second face second tip triangle 76 has the seventh cutting edge 41ba in common with the second face extension 59 shown in FIG. 4b.

Looking at FIGS. 7, 8, 9, and 10, the handgrip 12 may be all metal, appropriate when cooking for kebabs, or a wood, such as oak. Preferably the handgrip 12 is made of oak. The frame handle portion 13a is mortised in the handgrip 12 and the handgrip 12 may be covered by a wrap (not shown) made of a low heat transmissive material, such has leather, covering any exposed metal, such as the first fastener 32a and the second fastener 32b shown in FIG. 7, or the outer edge 29 of the frame handle portion 13a mortised in the handgrip 12 shown in FIG. 8. The wrap covers hot spots that might be touched by an individual holding the handgrip 12. Preferably, the handgrip 12 is long enough to allow an individual to place his fingers around the handgrip 12 without the fingers touching the frame handle portion 13a and the first 32a and second 32b fasteners joining the frame handle portion 13a to the handgrip 12.

Figure 2B:
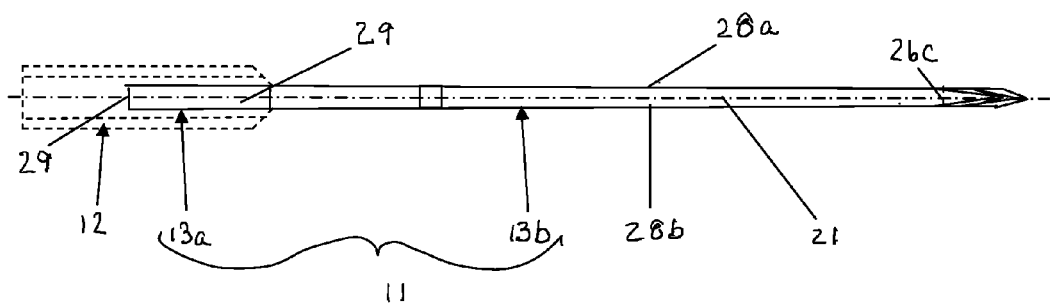
FIG. 2b shows an outer edge view of the frame of the present invention
Figure 2C:
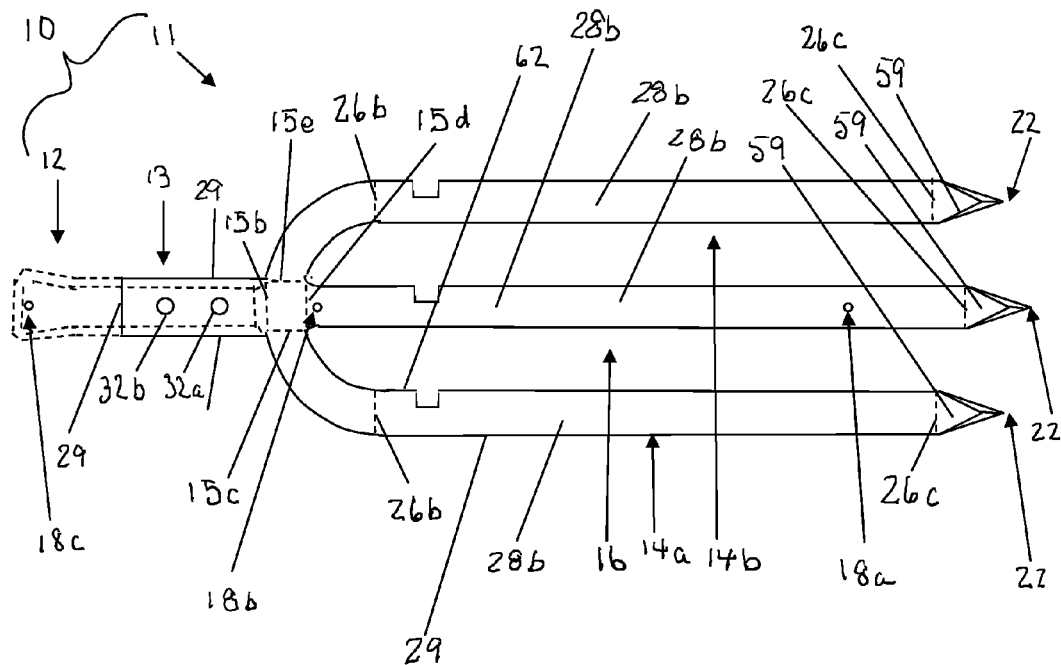
FIG. 2c shows a frame second face view of the present invention
Figure 2D:
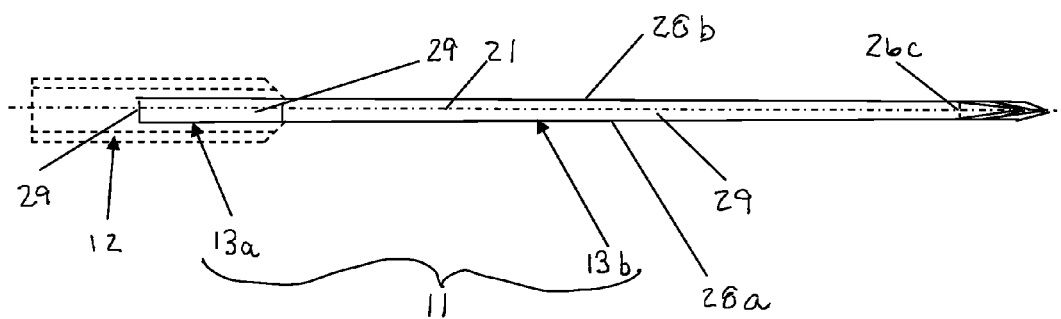
FIG. 2d shows another outer edge view the present invention

Looking again to FIG. 1, the asador spit 10 may have different embodiments of varying sizes: having an overall length as measured from the tip point 22 of the center blade 16 to the handgrip distal end 19 ranging from 80 to 40 cm, preferably 55 cm; and the asador spit 10 having an overall width, as measured from the outer edge 29 of the first outer blade 14a to the outer edge 29 of the second outer blade 14b, ranging from 30 cm to 10 cm, preferably 12.7 cm; and the blades having an identical blade width, for example, first outer blade 14a having a width as measured perpendicular to the longitudinal axis 21 across the outer-mid portion 26 from the outer edge 29 to a inner edge 62 ranging from 25 to 15 mm, preferably 22 mm; and looking at FIG. 2b, the frame 11 having a thickness as measured from the frame first face 28a to the frame second face 28b ranging from 7 mm to 2 mm, preferably 5 mm.

The frame handle portion 13a that has a width as measured traverse to the longitudinal axis 21 of 2 cm to 4 cm, preferably 3.3 cm, and a length of 7 cm to 10 cm, preferably 4.5 cm, as measured along the longitudinal axis 21 from the base portion 15 to the outer edge 29 of the frame handle portion 13a. Referring to FIGS. 7 and 8, the handgrip 12 tapers from the flare plane 88f to the handgrip distal end 19. The flare plane 88f has a length equal to the width of the frame handle portion, as measured across the outer edge 29 of frame handle portion 13a that is generally parallel to the handgrip distal end 19, and the flare plane 88f is generally perpendicular to the longitudinal axis 21 shown in FIG. 1, and the flare plane 88f is located 3.5 to 4 cm, preferably 3.8 cm from the handgrip distal end 19. The handgrip distal end 19 has a length as measured traverse to the longitudinal axis 21 of 4 to 5.2 cm, preferably 4.9 cm. and the handgrip 12 has a thickness of 1 to 4 cm, preferably 2.8 cm, as measured across the width of the flare plane 88f on a line perpendicular to the frame first face 28a. The handgrip has a length as measured along the longitudinal axis 21 or between 14 and 20 cm, preferably 16.25 cm.

Figure 11:
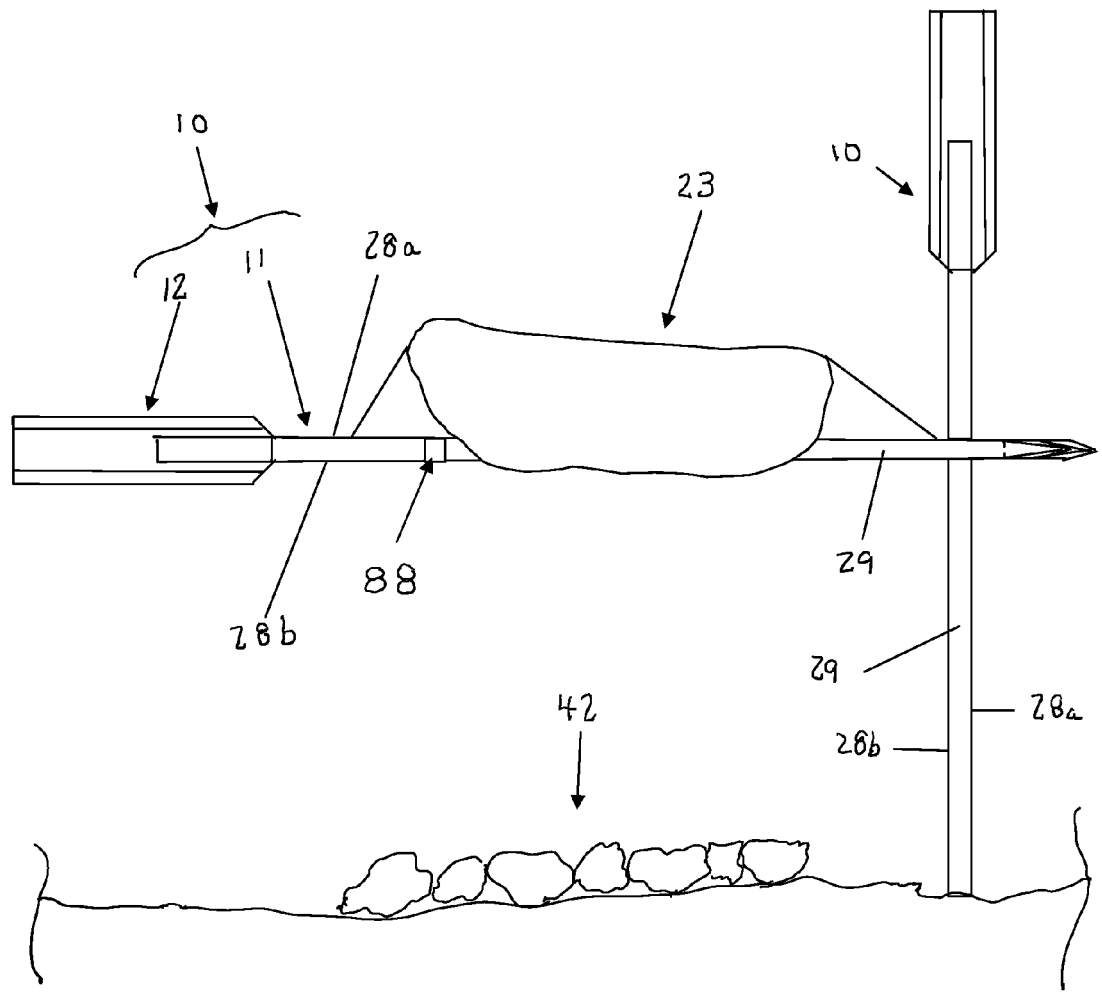
FIG. 11 shows a view of two copies of the present invention interlocked together

Looking at FIG. 1, the first outer blade 14a, the second outer blade 14b, and the center blade 16 each have a notch 88. The notch 88 of the first outer blade 14a, the notch 88 of second outer blade 14b, and the notch 88 of the center blade 16 are rectangular cuboids and are aligned along a notch line 88b that is perpendicular to the longitudinal axis 21. The notch 88 has a notch depth 88d as measured parallel to the notch line 88b of 0.2 to 0.4, preferably 0.33, the width of the second outer blade 14b, and a notch height 88h somewhat larger, preferably 1 mm larger than the thickness of the outer-mid portion 26 of the second outer blade 14b, allowing the notches 88 of the asador spit 10 to be interlocked with like notches 88 of a like asador spit 10 as shown in FIG. 11 holding the asador spit in a horizontal position. The notch line 88b as shown in FIG. 1 is located 20 to 40 mm, preferably 30 mm, forward of the base portion 15. Although not shown, the notch line 88b may be located across the base portion 15, the blade corner portion 24 of the first outer blade 14a and the blade corner portion 24 of the second outer blade 14a. When the notch line 88b runs across the base portion, the notch 88 for the center blade 16 is moved to the base portion 15, and is a through opening (not shown) sized fit the center-mid portion 27 of the center blade 16 through the through opening; and the notches 88 (not shown) for the first outer blade 14a and the second outer blade 14b are in the outer edge 29 of the blade corner portion 24 of the first outer blade 14a and the outer edge 29 of the blade corner portion 24 of the second outer blade 14b.

Figure 12:
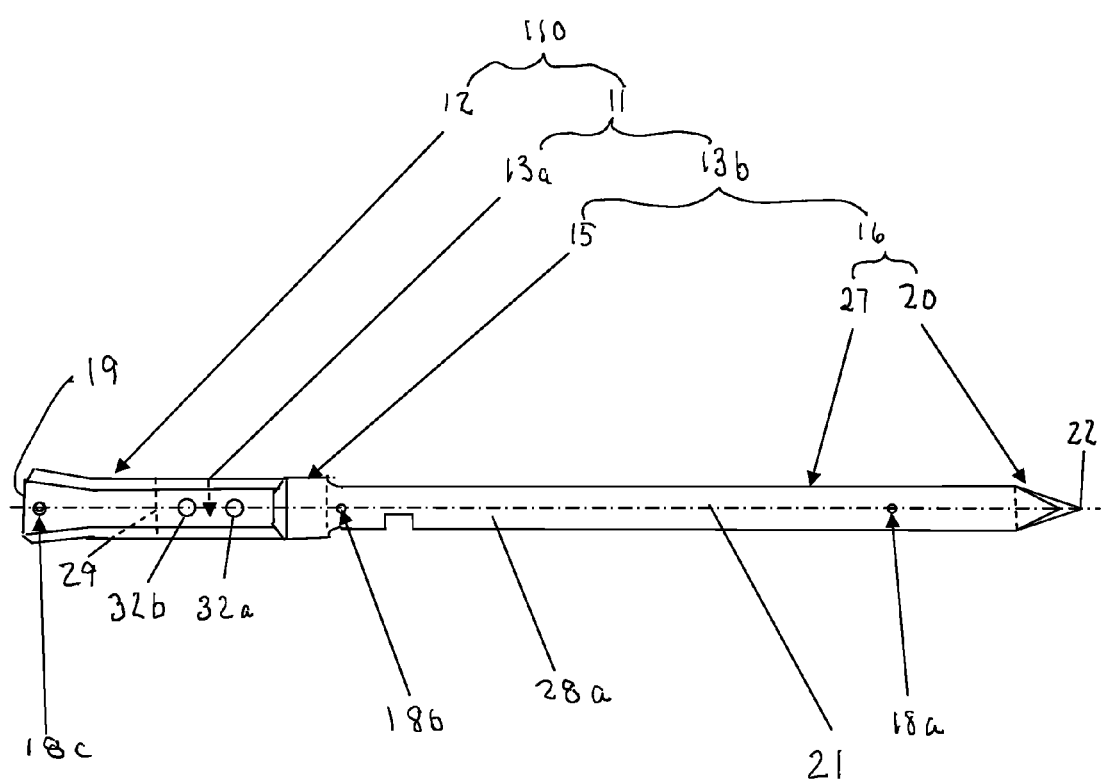
FIG. 12 shows another embodiment of the present invention

Referring to FIG. 12, another embodiment of the invention, a single blade asador spit 110 is shown. The single blade asador spit 110 is the asador spit 10 shown in FIG. 1 with the first outer blade 14a and the second outer blade 14b removed.

Figure 13:
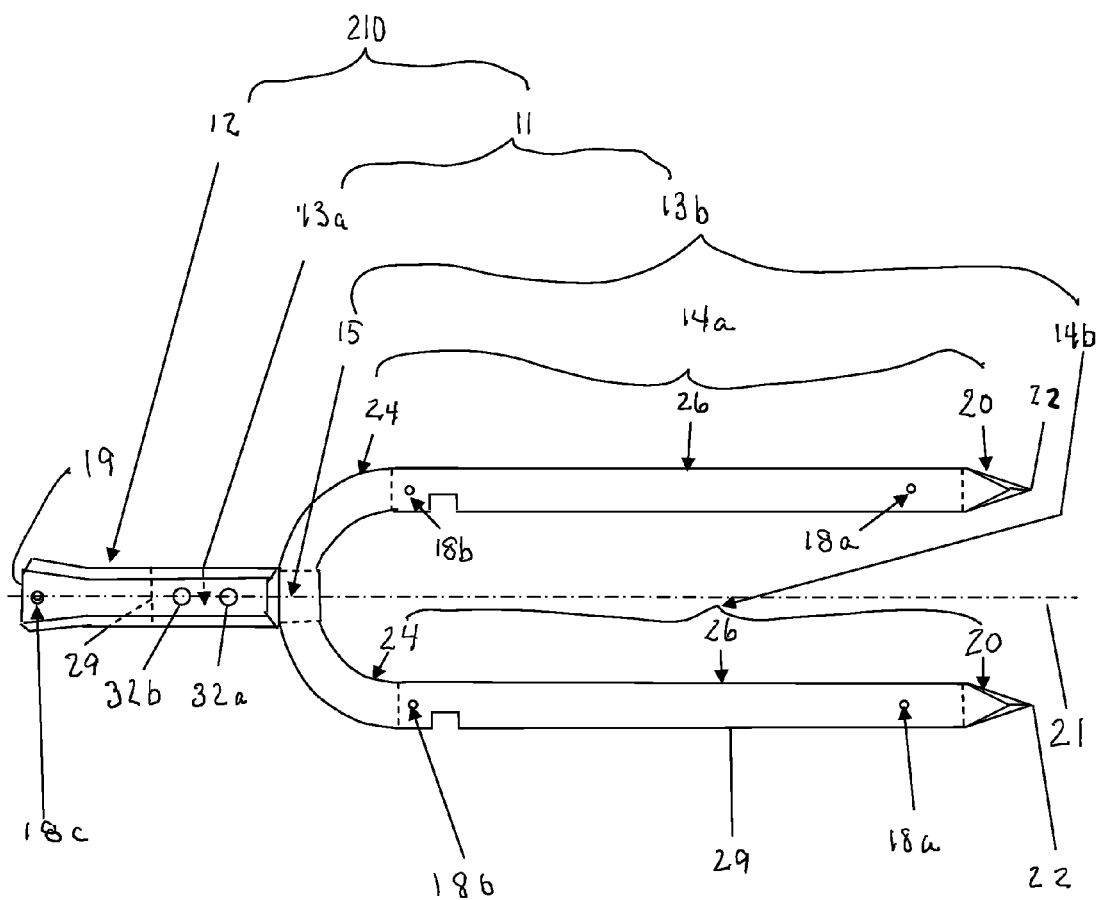
FIG. 13 shows a further embodiment of the present invention

Referring to FIG. 13, a further embodiment of the present invention, a two blade asador spit 210 is shown. The two blade asador spit 210 is the asador spit 10 in FIG. 1 with the center blade 16 removed. When there are an even number of blades, such as the first outer blade 14a and the second outer blade 14b, two center blades will extend forward of the tip point of any other blades, and the tip points of the two center blades, such as the tip point 22 of the first outer blade 14a and tip point 22 of the second outer blade 14b will be even with each other.

Although the present invention has been described in considerable detail with reference to preferred versions thereof, other versions are possible. Therefore, the spirit and scope of the appended claims should not be limited to the description of the preferred versions contained herein. Various deviations and modification may be made within the spirit and scope of this invention without departing from the main theme thereof.

What is claimed is:

1. An asador spit comprising: a frame and a handgrip;
   said frame comprising a frame handle portion, a base portion, one or more blades, and a suspension hole;
   said one or more blades each having a tip portion tapering to a tip point;
   said one or more blades each comprising a mid portion and the tip portion;
   said mid portion located between the base portion and the tip portion;
   said one or more blades each having a forward tie-down hole and a rear tie-down hole; said forward tie-down hole and said rear tie-down hole located in the mid portion;
   said forward tie-down hole between the rear tie-down hole and the tip portion of each of the one or more blades;
   said frame handle portion extending from the base portion opposite the one or more blades;
   said handgrip attached to the frame handle portion;
   said one or more blades each having a notch;
   said notch of the one or more blades on a notch line;
   said notch line perpendicular to a longitudinal axis;
   said forward tie-down hole located between said rear tie-down hole and the tip portion;
   said suspension hole located on the handgrip.

2. The asador spit of claim 1 wherein the tip portion further comprises a plurality of triangular faces that form in a plurality of cutting edges.

3. The asador spit of claim 1 wherein the tip portion further comprises at least five triangular faces that form at least five cutting edges.

4. The asador spit in claim 1 wherein the tip portion further comprises: a first face extension, a second face extension, a first edge extension and a second edge extension, a first face first tip triangle, a first face second tip triangle, a second face first tip triangle, and a second face second tip triangle;
   said first face extension, said second face extension, said first edge extension, said second edge extension, said first face first tip triangle, said first face second tip triangle, said second face first tip triangle, and said second face second tip triangle forming a first cutting edge, a second cutting edge, a third cutting edge, a fourth cutting edge, a fifth cutting edge, a sixth cutting edge, a seventh cutting edge, an eighth cutting edge, a ninth cutting edge, and a tenth cutting edge;
   said first edge extension and said second edge extension each being triangular faces of the same dimensions;
   said first edge extension narrowing along is the fourth cutting edge, the fourth cutting edge also being in common with the first face first tip triangle, and the narrowing of the first edge extension further occurring along the ninth cutting edge, the ninth cutting edge also being in common with the second face first tip triangle;

said second edge extension narrowing along the fifth cutting edge, the fifth cutting edge also being in common with the first face second tip triangle, and the narrowing of the second edge extension further occurring along the tenth cutting edge, the tenth cutting edge also being in common with the second face second tip triangle;

said first face first tip triangle having the first cutting edge in common with the first face extension, and the first face first tip triangle having the third cutting edge in common with the first face second tip triangle;

said second face first tip triangle having the sixth cutting edge in common with the second face extension, and said second face first tip triangle having the eighth cutting edge in common with the second face second tip triangle;

said first face second tip triangle having the second cutting edge in common with said first face extension;

said second face second tip triangle having the seventh cutting edge in common with said second face extension.

5. An asador spit of claim 1 wherein the one or more blades that is an odd number of blades has the tip point of a center blade extending forward of any other blade.

6. An asador spit of claim 1 wherein the one or more blades that is an even number of blades has the tip point of each of two center blades extending forward of the tip point of any other blades, and the tip point of each of the two center blades even with each other.

7. An asador spit comprising: a frame and a handgrip;

said frame comprising a frame handle portion, a base portion, one or more blades, at least on forward tie-down hole, at least on rear tie-down hole, and a suspension hole;

said one or more blades each having a tip portion;

said tip portion tapering to a tip point;

said one or more blades each comprising a mid portion and the tip portion;

said one or more blades each having a notch; said notch on a notch line perpendicular to a longitudinal axis of the asador spit;

said mid portion located between the base portion and the tip portion;

said frame handle portion extending from the base portion opposite the one or more blades;

said forward tie-down hole located between the rear tie-down hole and the tip portion;

said handgrip attached to the frame handle portion.

8. The asador spit of claim 7 wherein the tip portion further comprises a plurality of triangular faces forming a plurality of cutting edges.

9. The asador spit of claim 7 wherein the tip portion further comprises at least five triangular faces that form at least five cutting edges.

10. The asador spit of claim 7 wherein the tip portion further comprises:

a first face extension, a second face extension, a first edge extension and a second edge extension, a first face first tip triangle, a first face second tip triangle, a second face first tip triangle, and a second face second tip triangle;

said first face extension, said second face extension, said first edge extension, said second edge extension, said first face first tip triangle, said first face second tip triangle, said second face first tip triangle, and said second face second tip triangle forming a first cutting edge, a second cutting edge, a third cutting edge, a fourth cutting edge, a fifth cutting edge, a sixth cutting edge, a seventh cutting edge, an eighth cutting edge, a ninth cutting edge, and a tenth cutting edge;

said first edge extension and said second edge extension each being triangular faces of the same dimensions;

said first edge extension narrowing along the fourth cutting edge, the fourth cutting edge also being in common with the first face first tip triangle, and the narrowing of the first edge extension further occurring along the ninth cutting edge, the ninth cutting edge also being in common with the second face first tip triangle;

said second edge extension narrowing to the tip point, the narrowing of the second edge extension occurring along the fifth cutting edge, the fifth cutting edge also being in common with the first face second tip triangle, and the narrowing of the second edge extension further occurring along the tenth cutting edge, the tenth cutting edge also being in common with the second face second tip triangle;

said first face first tip triangle having the first cutting edge in common with the first face extension, and the first face first tip triangle having the third cutting edge in common with the first face second tip triangle;

said second face first tip triangle having the sixth cutting edge in common with the second face extension, and said second face first tip triangle having the eighth cutting edge in common with the second face second tip triangle;

said first face second tip triangle having the second cutting edge in common with said first face extension; and said second face second tip triangle having the seventh cutting edge in common with said second face extension.

11. An asador spit of claim 7 wherein the one or more blades that is an odd number of blades will have the tip point of a center blade will be forward of the tip point of any other blade.

12. An asador spit of claim 7 wherein the one or more blades that is an even number of blades will have the tip point of each of two center blades extending forward of the tip point of any other blades, and the tip point of each of the two center blades will be even with each other.

13. An asador spit comprising: a frame and a handgrip;

said frame comprising an frame handle portion, a base portion, a forward tie-down hole, a rear tie-down hole, a suspension hole, a first outer blade, a second outer blade, and a center blade;

said first outer blade, said second outer blade, and said center blade each having a tip portion that is identical;

said tip portion tapering to a tip point;

said first outer blade and said second outer blade each comprising a blade corner portion, an outer-mid portion, and the tip portion;

said outer-mid portion located between the blade corner portion and the tip portion;

said center blade comprising a center-mid portion and the tip portion;

said center-mid portion located between the base portion and the tip portion of the center blade;

said outer-mid portion of the first outer blade, the outer-mid portion of the second outer blade, and said center-mid portion of the center blade each have a rectangular cross section, with the center-mid portion being somewhat longer than each of the outer-mid portion of the first outer blade and the second outer blade, and the tip point of the center blade being forward of the tip point of the first outer blade and the tip point of the second outer blade;

said outer-mid portion of the first outer blade and the outer-mid portion of the second outer blade being parallel to the center-mid portion of the center blade, and the outer-mid portion of the first outer blade and the outer-mid portion of the second outer blade each being evenly spaced from the center-mid portion of the center blade, and the tip point of the center blade being forward of the tip point of the first outer blade and the tip point of the second outer blade;

said first outer blade, said second outer blade and said center blade each having a notch;

said notch of the first outer blade, said notch of the second outer blade and said notch of the center blade aligned on a notch line perpendicular to a longitudinal axis of the asador spit;

said notch of the first outer blade, said notch of the second outer blade and said notch of the center blade sized to allow the asador spit to interlock with a like spit thereby allowing the asador spit to hold the like spit generally perpendicular to the asador spit when the asador spit is impaled in a ground surface;

said forward tie-down hole and said rear tie-down hole located in the center-mid portion of the center blade; said forward tie-down hole between the rear tie-down hole and the tip portion.

14. The asador spit on claim 13, wherein said tip portion further comprises a plurality of triangular faces that form a plurality of cutting edges.

15. The asador spit in claim 13 wherein the tip portion further comprises: a first face extension, a second face extension, a first edge extension and a second edge extension, a first face first tip triangle, a first face second tip triangle, a second face first tip triangle, and a second face second tip triangle;

said first face extension, said second face extension, said first edge extension, said second edge extension, said first face first tip triangle, said first face second tip triangle, said second face first tip triangle, and said second face second tip triangle forming a first cutting edge, a second cutting edge, a third cutting edge, a fourth cutting edge, a fifth cutting edge, a sixth cutting edge, a seventh cutting edge, an eighth cutting edge, a ninth cutting edge, and a tenth cutting edge;

said first edge extension and said second edge extension each being triangular faces of the same dimensions;

said first edge extension narrowing from to the tip point, the narrowing of the first edge extension occurring along is the fourth cutting edge, the fourth cutting edge also being in common with the first face first tip triangle, and the narrowing of the first edge extension further occurring along the ninth cutting edge, the ninth cutting edge also being in common with the second face first tip triangle;

said second edge extension narrowing to the tip point, the narrowing of the second edge extension occurring along the fifth cutting edge, the fifth cutting edge also being in common with the first face second tip triangle, and the narrowing of the second edge extension further occurring along the tenth cutting edge, the tenth cutting edge also being in common with the second face second tip triangle;

said first face first tip triangle having the first cutting edge in common with the first face extension, and the first face first tip triangle having the third cutting edge in common with the first face second tip triangle;

said second face first tip triangle having the sixth cutting edge in common with the second face extension, and said second face first tip triangle having the eighth cutting edge in common with the second face second tip triangle;

said first face second tip triangle having the second cutting edge in common with said first face extension; and said second face second tip triangle having the seventh cutting edge in common with said second face extension.

* * * * *